(12) United States Patent
Barkan et al.

(10) Patent No.: US 11,334,734 B1
(45) Date of Patent: May 17, 2022

(54) METHODS AND APPARATUSES TO MITIGATE SPECULAR REFLECTIONS AND DIRECT ILLUMINATION INTERFERENCE IN BIOPTIC BARCODE READERS

(71) Applicant: ZEBRA TECHNOLOGIES CORPORATION, Lincolnshire, IL (US)

(72) Inventors: Edward Barkan, Miller Place, NY (US); Mark Drzymala, Saint James, NY (US); Darran Michael Handshaw, Sound Beach, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 17/389,150

(22) Filed: Jul. 29, 2021

(51) Int. Cl.
  *G06K 7/10* (2006.01)
  *G06K 7/14* (2006.01)

(52) U.S. Cl.
  CPC ....... *G06K 7/10831* (2013.01); *G06K 7/1413* (2013.01)

(58) Field of Classification Search
  CPC .......... G06K 7/10831; G06K 7/1413
  USPC ................................. 235/462.14
  See application file for complete search history.

(56) References Cited

U.S. PATENT DOCUMENTS

| | | | |
|---|---|---|---|
| 11,210,481 B1* | 12/2021 | Drzymala | G06K 7/10574 |
| 2013/0175343 A1* | 7/2013 | Good | G06K 7/10831 235/462.32 |
| 2017/0011243 A1* | 1/2017 | Hammer | G06K 7/10722 |

* cited by examiner

*Primary Examiner* — Jamara A Franklin
(74) *Attorney, Agent, or Firm* — Yuri Astvatsaturov

(57) ABSTRACT

Example methods and apparatuses to mitigate specular reflections and direct illumination interference in bioptic barcode readers are disclosed. An example method includes creating a first sub-field of view passing through a first window, creating a second sub-field of view passing through a second window, while activating a first illumination source to illuminate the first sub-field of view and deactivating a second illumination source associated with the second sub-field of view, capturing first images of the first sub-field of view, while activating the second illumination source to illuminate the second sub-field of view and deactivating the first illumination source, capturing second images of the second sub-field of view, and attempting to decode a barcode within at least one of the first images and the second images.

20 Claims, 9 Drawing Sheets

METHODS AND APPARATUSES TO MITIGATE SPECULAR REFLECTIONS AND DIRECT ILLUMINATION INTERFERENCE IN BIOPTIC BARCODE READERS

FIELD OF THE DISCLOSURE

This disclosure relates generally to bioptic barcode readers, and, more particularly, to methods and apparatuses to mitigate specular reflections and direct illumination interference in bioptic barcode readers.

BACKGROUND

In a bioptic barcode reader, it is desirable to have leading and trailing sub-fields of view coming out of the upright window of the vertical tower and/or out of the horizontal window of the bioptic barcode reader. This helps improve the scanning and decoding of barcodes on the leading and trailing sides of an object being swiped in front of the bioptic barcode reader from one side to the other. It is desirable to have multiple illumination sources, each dedicated to a respective sub-field of view, in order to improve the illumination of the sub-fields of view. However, this can create a problem with specular barcodes (e.g., barcodes printed on shiny surfaces). When a specular barcode is held at a specific angle with respect to the bioptic barcode reader, a specular reflection (e.g., light reflected into a single outgoing direction) may obscure at least part of the barcode, rendering it undecodable. With the advent of self-checkout stations, it is desirable to have the leading and trailing sub-fields of view come out from the vertical window straighter toward a user because this helps when barcodes are presented rather than swiped. However, when this type of system is implemented, specular reflections may become more common. Illumination interference may also occur when illumination of one sub-field of view falls directly incident (e.g., not via reflection off an object in a product scanning region of a bioptic barcode reader) back into the bioptic barcode reader via another sub-field of view. Accordingly, there is a need for methods and apparatuses to mitigate specular reflections and direct illumination interference in bioptic barcode readers.

SUMMARY

In an embodiment, a bioptic barcode reader having a product scanning region includes a housing having a lower housing portion with an upper surface facing the product scanning region, and an upper housing portion extending above the lower housing portion and facing the product scanning region. A generally upright window is positioned in the upper housing portion. The bioptic barcode reader includes an image sensor having a primary field of view and an optical assembly configured to split the primary field of view into at least a first sub-field of view and a second sub-field of view. The first sub-field of view passes from a first half of the upper housing portion through the upright window and crosses a midline of the product scanning region in a first direction. The second sub-field of view passes from a second half of the upper housing portion through the upright window and crosses the midline of the product scanning region in a second direction. The second half of the upper housing portion is opposite the first half of the upper housing portion, and the second direction is different from the first direction. The bioptic barcode reader further includes a first illumination source positioned in the first half of the upper housing portion and configured to illuminate targets appearing within the first sub-field of view, and a second illumination source positioned in the second half of the upper housing portion and configured to illuminate targets appearing within the second sub-field of view. The bioptic barcode reader additionally includes a controller communicatively coupled to the image sensor, the first illumination source and the second illumination source. The controller is configured to instruct the image sensor to capture first images of the first sub-field of view while activating the first illumination source and deactivating the second illumination source, and instruct the image sensor to capture second images of the second sub-field of view while activating the second illumination source and deactivating the first illumination source. The bioptic barcode reader still further includes a decoder configured to attempt to decode a barcode within at least one of the first images and the second images.

In variations of this embodiment, the bioptic barcode reader further includes a generally horizontal window positioned at the upper surface of the lower housing portion, and the optical assembly is configured to further split the primary field of view into a third sub-field of view, wherein the third sub-field of view passes through the horizontal window.

In variations of this embodiment, the image sensor is configured to capture the first images using a first portion of the image sensor corresponding to the first sub-field of view, and to capture the second images using a second portion of the image sensor corresponding to the second sub-field of view.

In variations of this embodiment, a direction in which pixel data is read out from the image sensor is parallel to a boundary between the first and second portions of the image sensor.

In variations of this embodiment, the image sensor is configured to capture the first images of the first sub-field of view by capturing third images of the primary field of view, and the decoder is configured to attempt to decode the barcode within at least one of the first images by attempting to decode the barcode in a portion of at least one of the third images.

In variations of this embodiment, the first sub-field of view is oriented to form a leading sub-field of view, and the second sub-field of view is oriented to form a trailing sub-field of view.

In variations of this embodiment, the first illumination source is oriented to correspond to the first sub-field of view, and the second illumination source is oriented to correspond to the second sub-field of view.

In variations of this embodiment, the first images of the first sub-field of view are captured at a predetermined framerate of 60 frames per second, and the second images of the second sub-field of view are captured at a predetermined framerate of 60 frames per second.

In another embodiment, a method of operating a bioptic barcode reader having a product scanning region, wherein the bioptic barcode reader includes a housing having a lower housing portion with an upper surface facing the product scanning region, an upper housing portion extending above the lower housing portion and facing the product scanning region, a generally upright window positioned in the upper housing portion, and an image sensor having a primary field of view, includes splitting the primary field of view into at least a first sub-field of view and a second sub-field of view, wherein the first sub-field of view passes from a first half of the upper housing portion through the upright window and crosses a midline of the product scanning region in a first direction, wherein the second sub-field of view passes from a second half of the upper housing portion through the upright window and crosses the midline of the product scanning region in a second direction, wherein the second half of the upper housing portion is opposite the first half of the upper housing portion, and wherein the second direction is different from the first direction. The method further includes, while activating a first illumination source to illuminate targets appearing within the first sub-field of view and deactivating a second illumination source, instructing the image sensor to capture first images of the first sub-field of view, wherein the first illumination source is positioned in the first half of the upper housing portion, and wherein the second illumination source is positioned in the second half of the upper housing portion. The method additionally includes, while activating the second illumination source to illuminate targets appearing within the second sub-field of view and deactivating the first illumination source, instructing the image sensor to capture second images of the second sub-field of view. The method still further includes attempting to decode a barcode within at least one of the first images and the second images.

In variations of this embodiment, the lower housing portion includes a generally horizontal window positioned at the upper surface of the lower housing portion, and the method further includes splitting the primary field of view into a third sub-field of view that passes through the horizontal window.

In variations of this embodiment, the method further includes configuring the image sensor to capture the first images using a first portion of the image sensor corresponding to the first sub-field of view, and to capture the second images using a second portion of the image sensor corresponding to the second sub-field of view.

In variations of this embodiment, the method further includes reading out pixel data of the image sensor in a direction that is parallel to a boundary between the first and second portions of the image sensor.

In variations of this embodiment, the method further includes orienting the first sub-field of view to form a leading sub-field of view, and orienting the second sub-field of view to form a trailing sub-field of view.

In variations of this embodiment, the method further includes orienting the first illumination source to correspond to the first sub-field of view, and orienting the second illumination source to correspond to the second sub-field of view.

In variations of this embodiment, the method further includes instructing the image sensor to capture the first images of the first sub-field of view by capturing third images of the primary field of view, and the decoder is configured to attempt to decode the barcode within at least one of the first images by attempting to decode the barcode in a portion of at least one of the third images.

In yet another embodiment, a bioptic barcode reader having a product scanning region includes a housing having a lower housing portion and an upper housing portion extending above the lower housing portion. The bioptic barcode reader further includes an image sensor having a primary field of view, and an optical assembly configured to split the primary field of view into at least a first sub-field of view passing through a first window of the bioptic barcode reader, and a second sub-field of view passing through a second window of the bioptic barcode reader, wherein the first sub-field of view passes from a first portion of the housing through the first window and crosses the product scanning region in a first direction, wherein the second sub-field of view passes from a second portion of the housing through the second window and crosses the product scanning region in a second direction, wherein the second portion of the housing is different from the first portion of the housing, and wherein the second direction is different from the first direction. The bioptic barcode reader additionally includes a first illumination source positioned in the first portion of the housing and configured to illuminate targets appearing within the first sub-field of view, and a second illumination source positioned in the second portion of the housing and configured to illuminate targets appearing within the second sub-field of view. The bioptic barcode reader still further includes a controller communicatively coupled to the image sensor, the first illumination source and second illumination source. The controller configured to instruct the image sensor to capture first images of the first sub-field of view while activating the first illumination source and deactivating the second illumination source, and instruct the image sensor to capture second images of the second sub-field of view while activating the second illumination source and deactivating the first illumination source. The bioptic barcode reader including a decoder configured to attempt to decode a barcode within at least one of the first images and the second images.

In variations of this embodiment, the lower housing portion includes an upper surface facing the product scanning region, the first window is the second window, and the first window is positioned at the upper surface of the lower housing portion.

In variations of this embodiment, the lower housing portion comprises an upper surface facing the product scanning region, the first window is positioned at the upper surface of the lower housing portion, and the second window is generally upright and positioned in the upper housing portion.

In variations of this embodiment, the image sensor is configured to capture the first images using a first portion of the image sensor corresponding to the first sub-field of view, and to capture the second images using a second portion of the image sensor corresponding to the second sub-field of view.

In variations of this embodiment, the first illumination source is oriented to correspond to the first sub-field of view, and the second illumination source is oriented to correspond to the second sub-field of view.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments. The figures depict embodiments of this disclosure for purposes of illustration only. One skilled in the art will readily recognize from the following discussion that alternate embodiments of the systems and methods illustrated herein may be employed without departing from the principles set forth herein.

Figure 1:
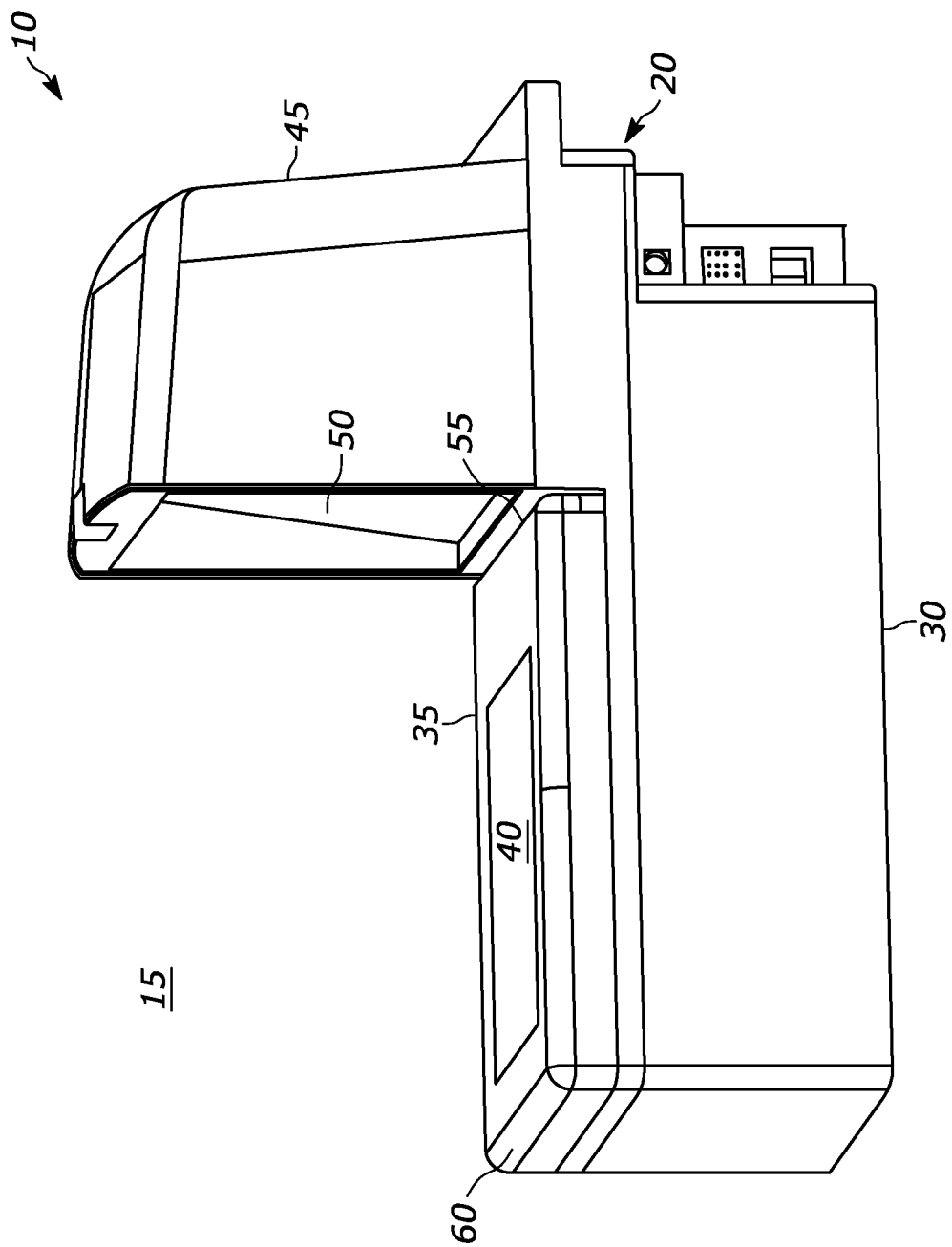
FIG. 1 illustrates a perspective view of an example bioptic barcode reader, in accordance with disclosed embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

Apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein. Connecting lines or connectors shown in the various figures presented are intended to represent example functional relationships and/or physical or logical couplings between the various elements.

DETAILED DESCRIPTION

Disclosed example bioptic barcode readers have different illumination sources for respective sub-fields of view (e.g., leading and trailing sub-fields of view). To mitigate specular reflections, disclosed example bioptic barcode readers alternately activate the illumination sources to alternately illuminate the sub-fields of view, and only process image data (e.g., decode barcodes) for the currently illuminated sub-field of view. This prevents a sub-field of view (e.g., a leading sub-field of view) from being exposed to specular reflections caused by illumination of a different sub-field of view (e.g., a trailing sub-field of view). This may be especially helpful when the sub-fields of view are oriented to enhance presentation performance at self-checkout stations. In embodiments, the alternative illumination of sub-fields of view may also be used to mitigate direct illumination interference when, for example, first and second sub-fields of view are oriented such that a portion of a field of light emitted by an illumination source associated with a first sub-field of view falls directly incident (e.g., not via a reflection off of an object in a product scanning region) back onto the source of a second sub-field of view. That is, the portion of the field of light is directed back into the bioptic barcode reader via the second sub-field of view and may cause an image sensor, or portion thereof, associated with the second sub-field of view to be directly "blinded" by the light. When the image sensor, or portion thereof, is "blinded," the light may prevent proper imaging of a barcode in the second sub-field of view, as may also occur with specular reflections.

When the sub-fields of view are created by splitting the primary field of view of an image sensor with an optical assembly (e.g., as described below in connection with FIGS. 2, 3A-B, 4A-C and 5A-B), only the portion of the image data captured by the image sensor that is associated with an illuminated sub-field of view needs to be processed to decode barcodes. Thus, in addition to mitigating specular reflections and/or direct illumination interference, such bioptic barcode readers may decode barcodes faster because a barcode decoder (e.g., a barcode decode module) needs to only consider a portion (e.g., half) of the image sensor's image data. Eliminating the portion of the primary field of view of the image sensor that is not being used with its preferred illumination may also prevent the barcode decoder from lingering on a barcode that is partially obscured by a specular reflection and/or direct illumination interference, which would be much more likely if/when the illumination for a different sub-field of view was also active. Disclosed example bioptic barcode readers may additionally have decreased memory requirements, as only a portion of an image sensor's image data needs to be stored at a time for decoding. Furthermore, when the image sensor is oriented such that the scan direction of the image sensor is parallel to the boundary between the sub-fields of view, only a portion of the image sensor needs to be exposed at a time, thus, shortening exposure time and/or increasing barcode scanning and decoding performance. Moreover, decreasing the amount of time that an illumination system is active may increase light-emitting diode (LED) lifetime and/or system reliability. Disclosed methods and systems are also applicable when multiple sub-fields of view emanate from the horizontal window of a bioptic barcode reader, and/or to mitigate specular reflections and/or direct illumination interference between sub-fields of view emanating from the vertical and the horizontal windows of a bioptic barcode reader.

Reference will now be made in detail to non-limiting examples, some of which are illustrated in the accompanying drawings.

Bioptic Barcode Reader

FIG. 1 is an illustration of an example bioptic barcode reader 10 that can be configured to be supported by a workstation, such as a checkout counter at a point of sale (POS) of a retail store, and has a product scanning region 15. The bioptic barcode reader 10 has a housing 20 that includes a lower housing portion 30 with an upper surface 35 that faces the product scanning region 15, and an upper housing portion 45 that extends above the lower housing portion 30. The upper surface 35 has a proximal edge 55 that is adjacent the upper housing portion 45, and a distal edge 60 that is generally parallel to and opposite the proximal edge 55.

A generally horizontal window 40 is positioned at the upper surface 35 of the lower housing portion 30 and is configured to allow first light to pass between the product scanning region 15 and an interior region 25 (FIG. 2) of the housing 20. A generally upright window 50 is positioned in the upper housing portion 45 and is configured to allow second light to pass between the product scanning region 15 and the interior region 25 of the housing 20. The first and second light intersect to define the product scanning region 15 of the bioptic barcode reader 10 where a product can be scanned for sale at the POS.

Optical Assemblies

In embodiments, different sub-fields of view may emanate through the horizontal and upright windows 40, 50. As will be described below, in some embodiments, the sub-fields of view are created by splitting a primary field of view of an image sensor with an optical assembly. Example optical assemblies for splitting a primary field of view of an image sensor to create sub-fields of view are described below in connection with FIGS. 2, 3A-B, 4A-C and 5A-B. Other example configurations of the optical assemblies are described in U.S. patent application Ser. No. 16/678,773, which was filed on Nov. 8, 2019. U.S. patent application Ser. No. 16/678,773 is hereby incorporated herein by reference in its entirety.

In other embodiments, the sub-fields of view may be respective primary fields of view of two or more image sensors without an optical assembly for splitting the primary fields of view. In still further embodiments, sub-fields of view may be created with a combination of splitting a first primary field of view of a first image sensor, and using a second primary field of view of a second image sensor as another sub-field of view.

Figure 2:
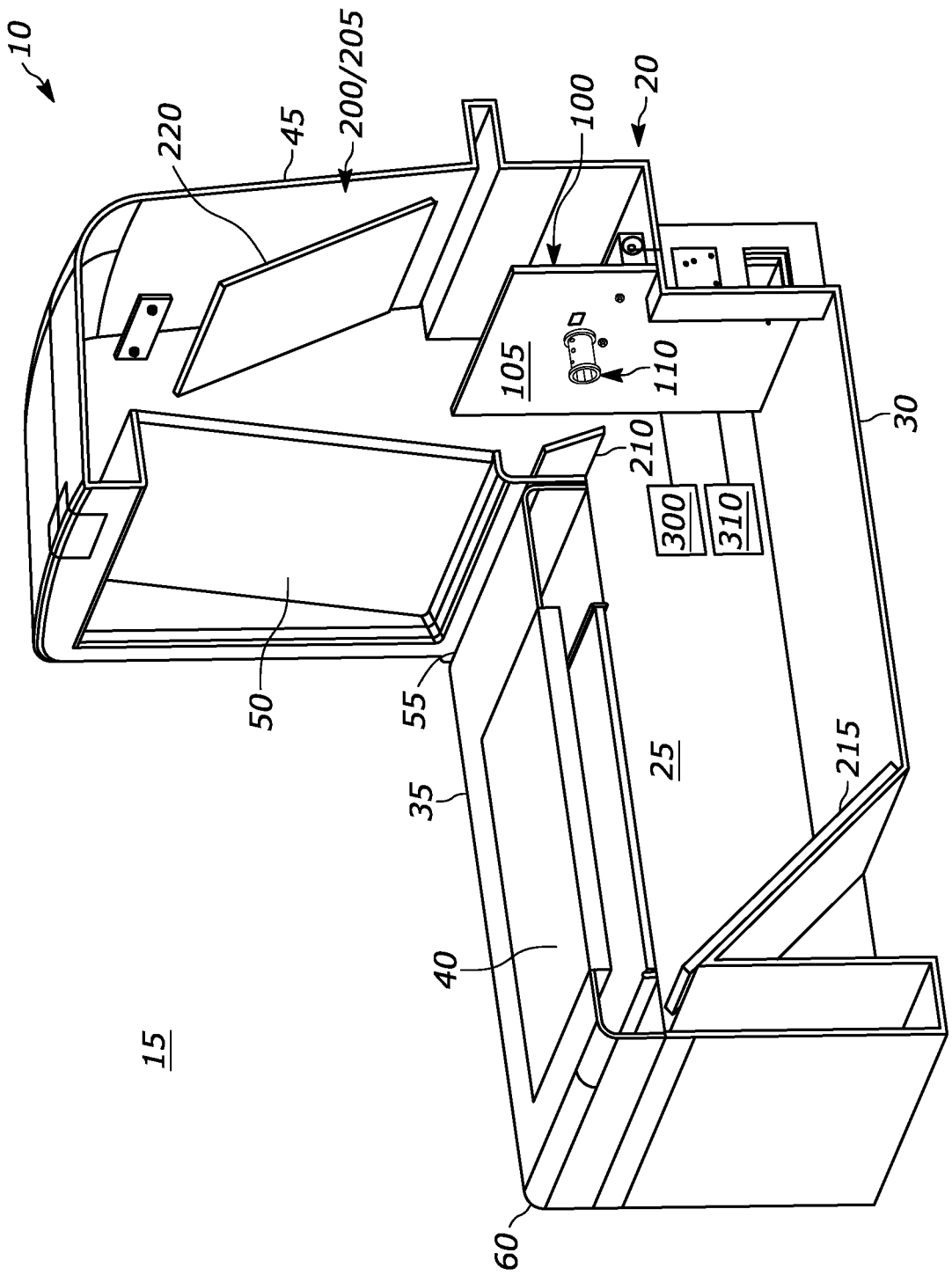
FIG. 2 illustrates a cutaway perspective view of the example bioptic barcode reader of FIG. 1 with a first example optical assembly, in accordance with disclosed embodiments.
Figure 3A:
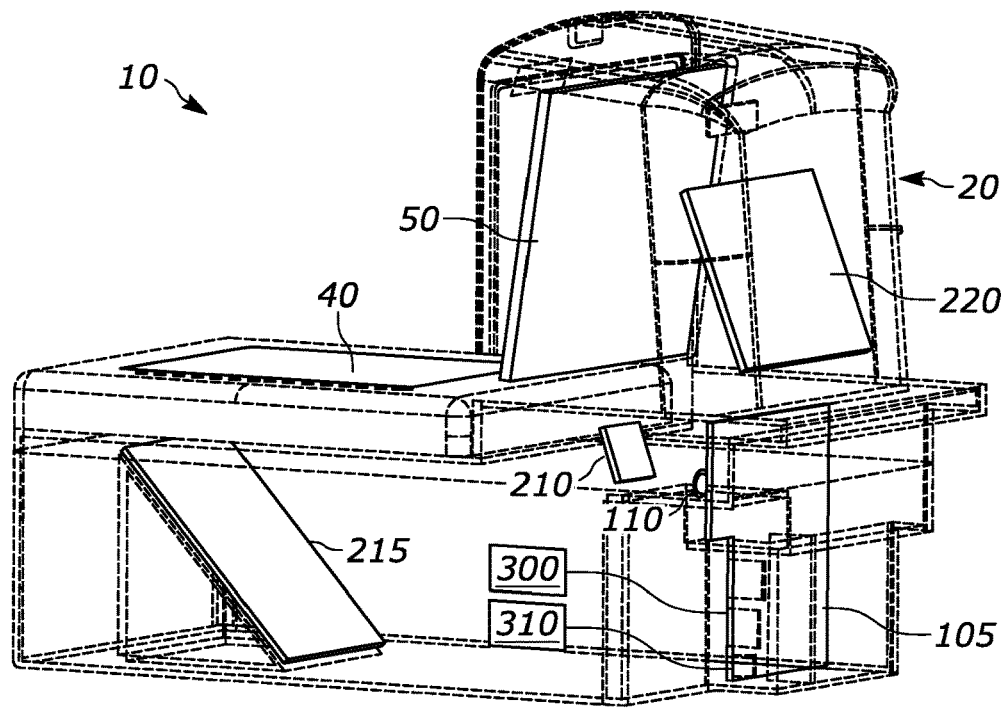
FIG. 3A illustrates the example bioptic barcode reader of FIG. 1 with the first example optical assembly of FIG. 2.
Figure 3B:
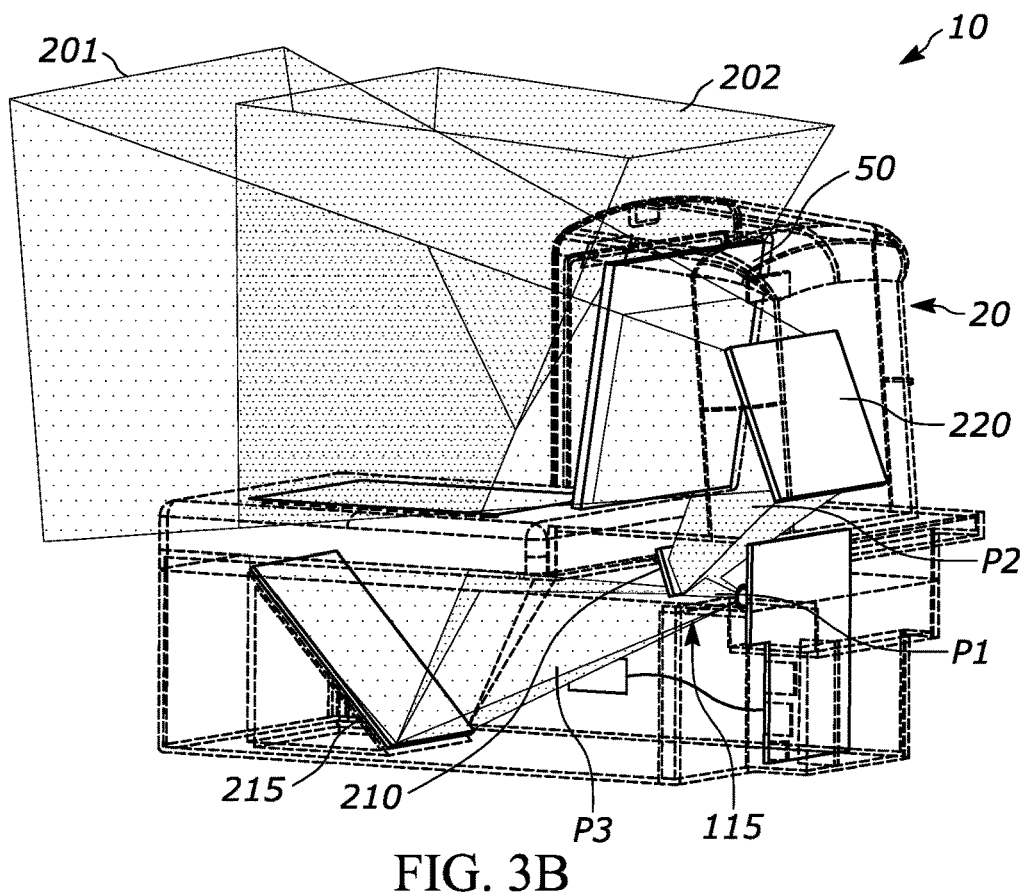
FIG. 3B illustrates the example bioptic barcode reader of FIG. 3A showing the sub-fields of view created by the first example optical assembly.

Referring to FIGS. 2, 3A, and 3B, the bioptic barcode reader 10 of FIG. 1 includes an example imaging assembly 100 and a first example optical assembly 200 positioned within the interior region 25 of the housing 20, and a barcode decoder 300 (e.g., a barcode decode module) communicatively coupled to imaging assembly 100 and configured to decode a barcode captured in image data (e.g., an image) captured by the imaging assembly 100. The imaging assembly 100 includes a printed circuit board 105 with a single image sensor 112 having a primary field-of-view 115. In the illustrated example, the printed circuit board 105 is aligned generally perpendicular to the upper surface 35, and the printed circuit board 105 and image sensor 112 are arranged to direct the primary field-of-view 115 generally parallel to the upper surface 35 and towards the distal edge 60 of the upper surface 35.

In embodiments, the printed circuit board 105 includes a computing system 310 for controlling the bioptic barcode reader 10. The computing system 310 may include the image sensor 112 and the barcode decoder 300. An example computing system 310 is described below in connection with FIG. 7.

The optical assembly 200 is configured to divide, split, etc. the primary field-of-view 115 into two sub-fields of view 201 and 202. The optical assembly 200 includes a mirror arrangement 205 with a splitter mirror 210, a first mirror 215, and a second mirror 220. The splitter mirror 210 is positioned directly in a first path P1 of a first portion of the primary field-of-view 115 and is configured to split the primary field-of-view 115 along a horizontal axis and redirect the first portion of the primary field-of-view 115 from the first path P1 to a second path P2 towards the second mirror 220.

The second mirror 220 is positioned directly in the second path P2 and is configured to redirect the first portion redirected from the splitter mirror 210 through the generally upright window 50 forming the sub-field of view 201. The second mirror 220 is positioned in a first portion of the housing 20 (e.g., the upper housing portion 45). The sub-field of view 201 emanates through the generally upright window 50 from the second mirror 220 in the first portion in a first direction and crosses the product scanning region 15.

The first mirror 215 is positioned directly in a third path P3 of a second portion of the primary field-of-view 115 and is configured to redirect the second portion through the generally horizontal window 40 forming the sub-field of view 202. The first mirror 215 is positioned in a second portion of the housing 20 (e.g., the lower housing portion 30). The sub-field of view 202 emanates through the generally horizontal window 40 from the first mirror 215 in the second portion in a second, different direction and crosses the product scanning region 15. In some embodiments, an angle between the first and second directions is about sixty degrees.

While not shown in FIGS. 3A and 3B for clarity of illustration, the bioptic barcode reader 10 may further include example illumination sources within the interior region 25 of the housing 20. The illumination sources may be positioned in the different portions of the interior region 25 of the housing 20 in association with the first mirror 215 and the second mirror 220 (e.g., one in the lower housing portion 30 in association with the first mirror 215, and one in the upper housing portion 45 in association with the second mirror 220), and are configured to provide illumination for respective ones of the sub-fields of view 201, 202. The illumination sources may include one or more LEDs.

Figure 4A:
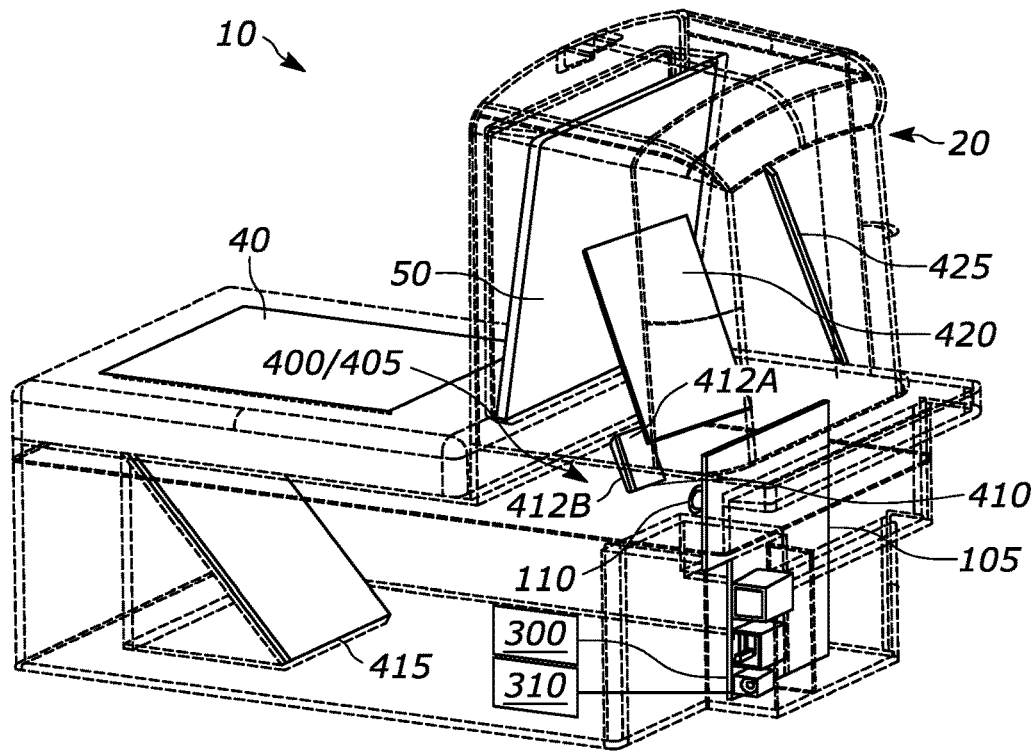
FIG. 4A illustrates the example bioptic barcode reader of FIG. 1 with a second example optical assembly, in accordance with disclosed embodiments.
Figure 4B:
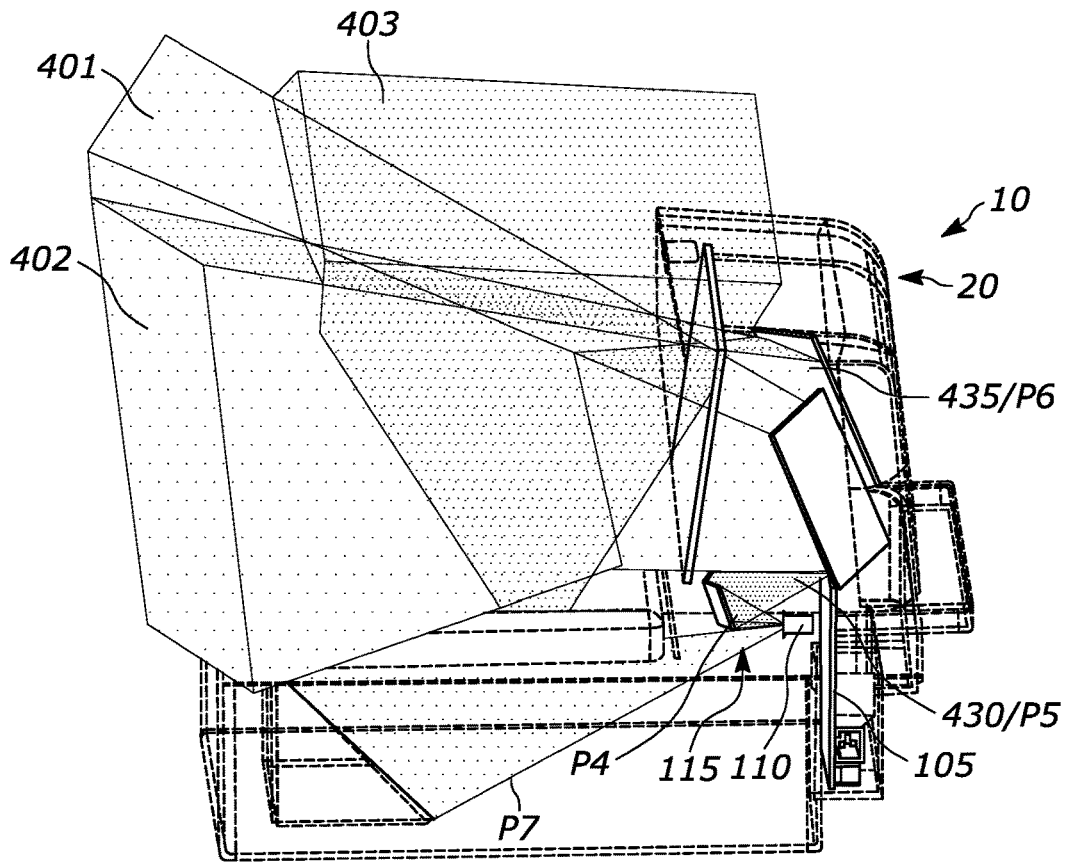
FIG. 4B illustrates the example bioptic barcode reader of FIG. 4A showing the sub-fields of view created by the second example optical assembly.
Figure 4C:
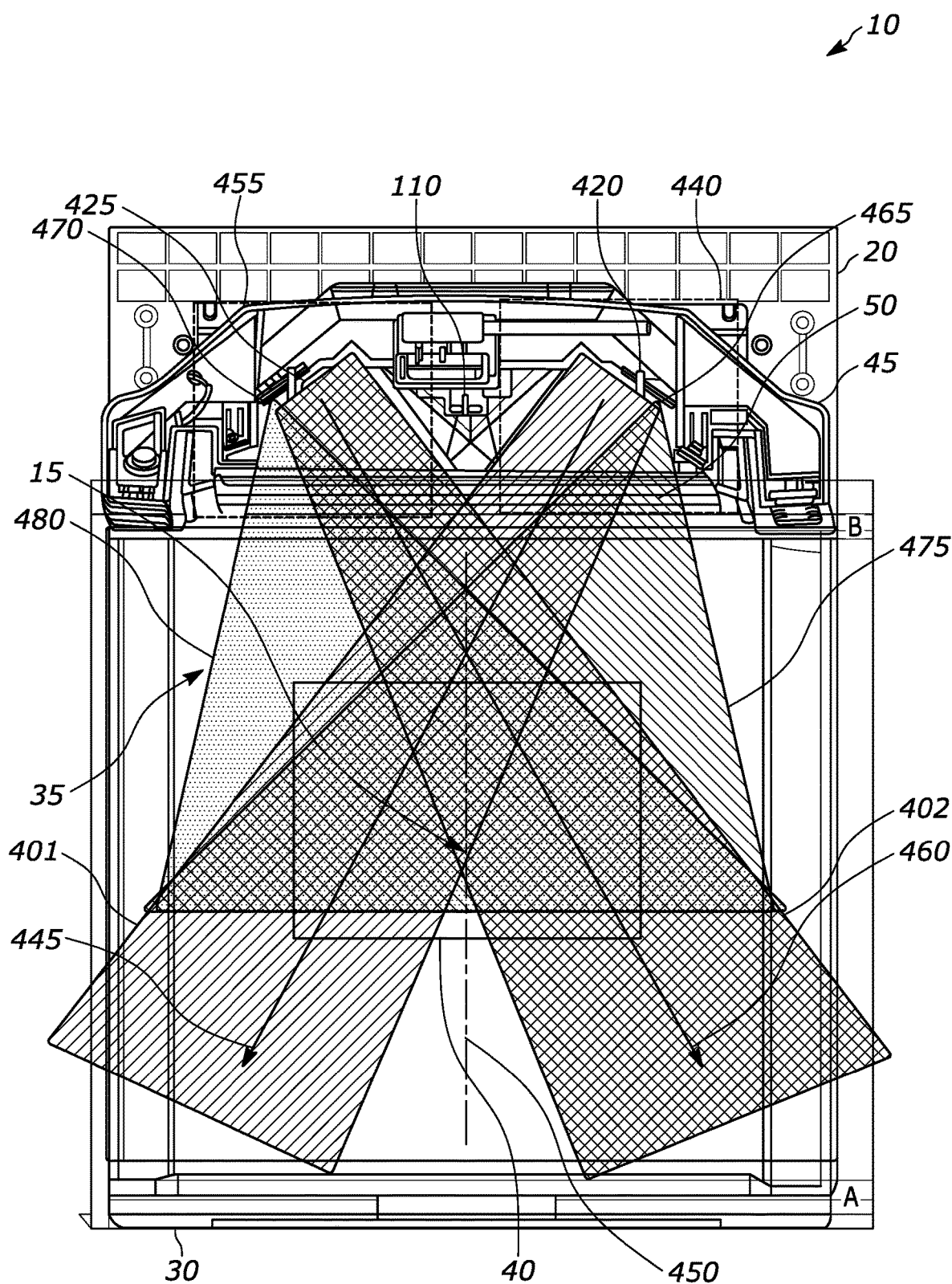
FIG. 4C illustrates a top, partial cutaway view of the example bioptic barcode reader of FIGS. 4A and 4B.

Referring to FIGS. 4A, 4B and 4C, the bioptic barcode reader 10 of FIG. 1 includes the imaging assembly 100 described above and a second example optical assembly 400 positioned within the interior region 25 of the housing 20, and the barcode decoder 300 communicatively coupled to the imaging assembly 100 and configured to decode a barcode captured in image data (e.g., an image) captured by the imaging assembly 100.

The optical assembly 400 is configured to divide, split, etc. the primary field-of-view 115 into sub-fields of view 401, 402 and 403. The optical assembly 400 includes a mirror arrangement 405 with a splitter mirror 410, a first mirror 415, a second mirror 420, and a third mirror 425. The splitter mirror 410 is positioned directly in a first path P4 of a first portion of the primary field-of-view 115 and is configured to split the primary field-of-view 115 along a horizontal axis, split the first portion of the primary field-of-view 115 into a first sub-field 430 and a second sub-field 435, redirect the first sub-field 430 from the first path P4 to a second path P5 towards the second mirror 420, and redirect the second sub-field 435 from the first path P4 to a third path P6 towards the third mirror 425. In this example, the splitter mirror 410 is a concave splitter mirror having first and second planar mirrors 412A, 412B that are arranged such that the second path P5 from the first planar mirror 412A and the third path P6 from the second planar mirror 412B cross.

The second mirror 420 is positioned directly in the second path P5 and is configured to redirect the first sub-field 430 redirected from the splitter mirror 410 through the generally upright window 50 forming the sub-field of view 401. As shown in FIG. 4C, the second mirror 420 is positioned in a first portion 440 of the housing 20 (e.g., first half of the upper housing portion 45). The sub-field of view 401 emanates through the generally upright window 50 from the second mirror 420 in the first portion 440 in a first direction 445 and crosses a midline 450 of the product scanning region 15.

The third mirror 425 is positioned directly in the third path P6 and is configured to redirect the second sub-field 435 redirected from the splitter mirror 410 through the generally upright window 50 forming the sub-field of view 402. As shown in FIG. 4C, the third mirror 425 is positioned in a second portion 455 of the housing (e.g., second half of the upper housing portion 45). The sub-field of view 402 emanates through the generally upright window 50 from the third mirror 425 in the second portion 455 in a second direction 460 and crosses the midline 450 of the product scanning region 15. In some embodiments, an angle between the first direction 445 and the second direction 460 is about sixty degrees.

The first mirror 415 is positioned directly in a fourth path P7 of a second portion of the primary field-of-view 115 and is configured to redirect the second portion through the generally horizontal window 40 forming the sub-field of view 403. The first mirror 415 is positioned in a third portion of the housing 20 (e.g., the lower housing portion 30). The sub-field of view 403 emanates through the generally horizontal window 40 from the first mirror 415 in the third portion in yet another direction and crosses the midline 450 of the product scanning region 15.

As shown in FIG. 4C, the bioptic barcode reader 10 further includes example illumination sources 465 and 470 within the interior region 25 of the housing 20. The illumination sources 465, 470 are positioned in respective ones of the first and second portions 440, 455, and are configured to provide illumination for respective ones of the sub-fields of view 401, 402. While not shown for clarity of illustration, there may be another illumination source associated with the first mirror 415 in the third portion (e.g., in the lower housing portion 30) to provide illumination for the sub-field of view 403. The illumination sources may include one or more LEDs.

Figure 5A:
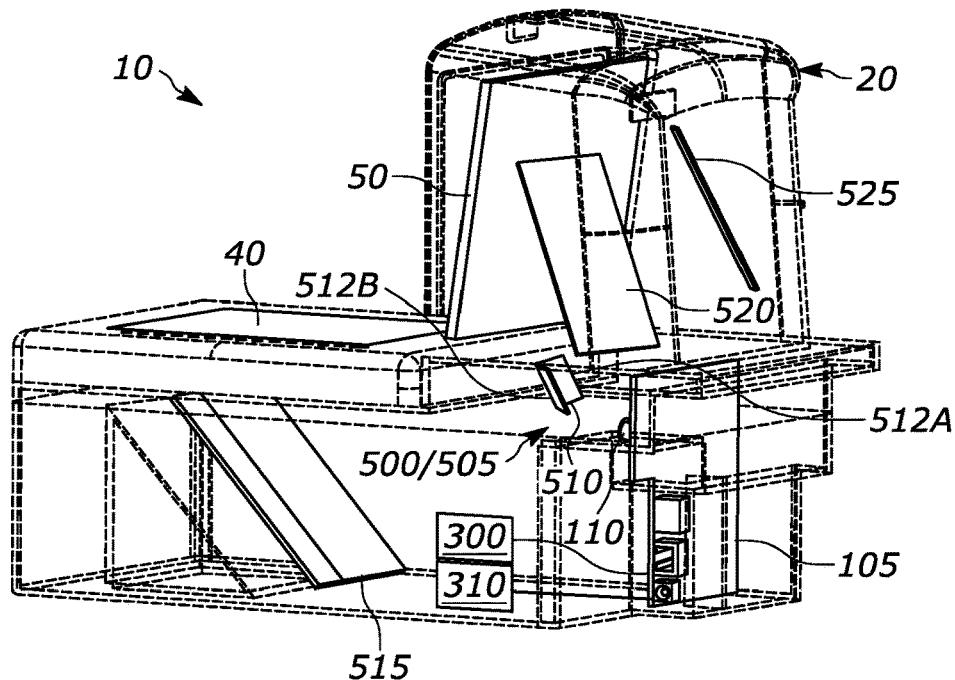
FIG. 5A illustrates the example bioptic barcode reader of FIG. 1 with a third example optical assembly, in accordance with disclosed embodiments.
Figure 5B:
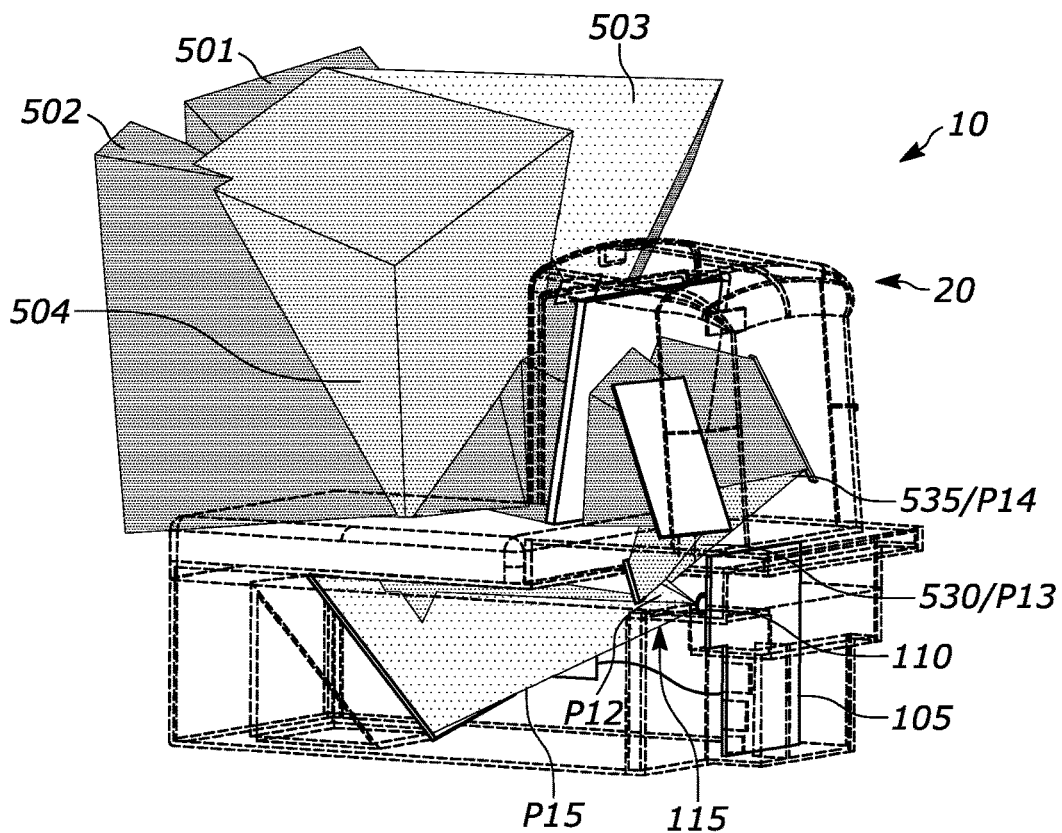
FIG. 5B illustrates the example bioptic barcode reader of FIG. 5A showing the sub-fields of view created by the third example optical assembly.

Referring to FIGS. 5A and 5B, the bioptic barcode reader 10 of FIG. 1 is illustrated with the first example imaging assembly 100 described above and a third example optical assembly 500 positioned within the interior region 25 of the housing 20, and the barcode decoder 300 communicatively coupled to imaging assembly 100 and configured to decode a barcode captured in image data (e.g., an image) capture by the imaging assembly 100.

The optical assembly 500 is configured to divide, split, etc. the primary field-of-view 115 into sub-fields of view 501, 502, 503 and 504. The optical assembly 500 includes a mirror arrangement 505 with a splitter mirror 510, a first mirror 515, a second mirror 520, and a third mirror 525. The splitter mirror 510 is positioned directly in a first path P12 of a first portion of the primary field-of-view 115 and is configured to split the primary field-of-view 115 along a horizontal axis, split the first portion of the primary field-of-view into a first sub-field 530 and a second sub-field 535, redirect the first sub-field 530 from the first path P12 to a second path P13 towards the second mirror 520, and redirect the second sub-field 535 from the first path P12 to a third path P14 towards the third mirror 525. In this example, the splitter mirror 510 is a concave splitter mirror having first and second planar mirrors 512A, 512B that are arranged such that the second path P13 from the first planar mirror 512A and the third path P14 from the second planar mirror 512B cross.

The second mirror 520 is positioned directly in the second path P13 and is configured to redirect the first sub-field 530 redirected from the splitter mirror 510 through the generally upright window 50 forming the sub-field of view 501. The second mirror 520 is positioned in a first portion of the housing 20 (e.g., a first half of the upper housing portion 45). The sub-field of view 502 emanates through the generally upright window 50 from the second mirror 520 in the first portion in a first direction and crosses the product scanning region 15.

The third mirror 525 is positioned directly in the third path P14 and is configured to redirect the second sub-field 535 redirected from the splitter mirror 510 through the generally upright window 50 forming the sub-field of view 502. The third mirror 525 is positioned in a second portion of the housing 20 (e.g., a second half of the upper housing portion 45). The sub-field of view 503 emanates through the generally upright window 50 from the third mirror 525 in the second portion in a second, different direction and crosses the product scanning region 15. In some embodiments, an angle between the first and second directions is about sixty degrees.

The first mirror 515 is positioned directly in a fourth path P15 of a second portion of the primary field-of-view 115 and is configured to redirect the second portion through the generally horizontal window 40. In this example, the first mirror 515 is a concave splitter mirror and is configured to split the second portion of the primary field-of-view 115 into the sub-field of view 503 and the sub-field of view 504, redirect the sub-field of view 503 through the generally horizontal window 40, and redirect the sub-field of view 504 through the generally horizontal window 40. The sub-field of view 503 emanates through the generally horizontal window 40 from the first mirror 515 in a third, different direction and crosses the product scanning region 15. The sub-field of view 504 emanates through the generally horizontal window 40 from the first mirror 515 in a fourth, different direction and crosses the product scanning region 15.

While not shown in FIGS. 5A and 5B for clarity of illustration, the bioptic barcode reader 10 may further include example illumination sources within the interior region 25 of the housing 20. The illumination sources may be positioned in respective different portions of the interior region 25 of the housing 20 (e.g., one in the first half of the upper housing portion 45 in association with the second mirror 520, one in the second half of the upper housing portion 45 in association with the third mirror 525, and two in the lower housing portion 30 in association with respective halves of the first mirror 515), and configured to provide illumination for respective ones of the sub-fields of view 501-504. The illumination sources may include one or more LEDs.

Mitigating Specular Reflections and/or Direct Illumination Interference

Figure 6:
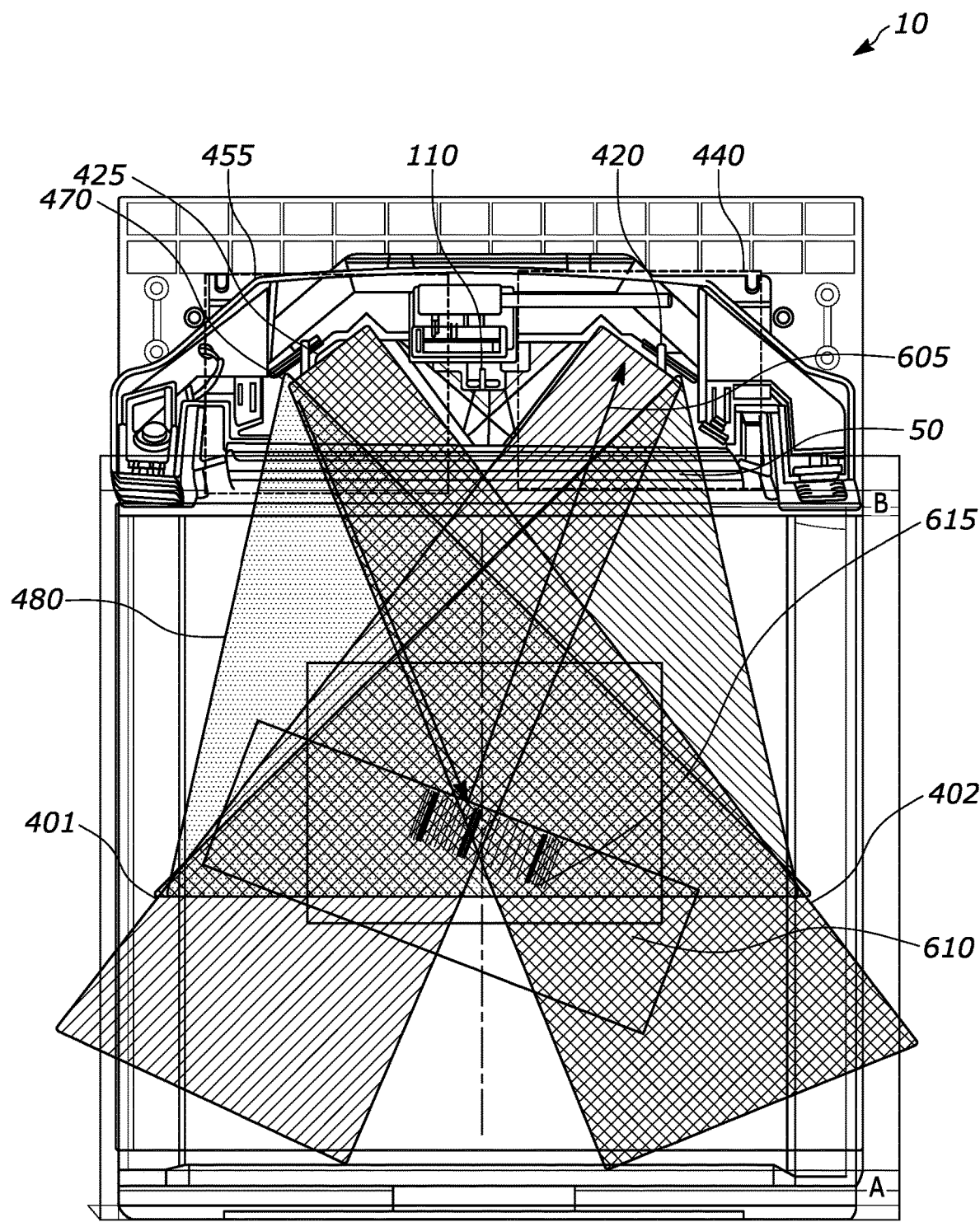
FIG. 6 illustrates an example specular reflection that may arise for the example bioptic barcode reader of FIGS. 4A and 4B.

FIG. 6 illustrates an example specular reflection 605 that may arise from bioptic barcode readers such as that described above in connection with FIGS. 4A-C. As shown, when the illumination source 470 for the sub-field of view 402 is active and an object 610 in the product scanning region 15 includes a specular barcode 615, the illumination 480 provided by the illumination source 470 may cause the specular reflection 605 in the sub-field of view 401. When such a specular reflection 605 occurs, image data captured by the image sensor 112 for the sub-field of view 401 may be undecodable by the barcode decoder 300. Such circumstances may cause delays, stalls, pauses, etc. in the decoding of barcodes by the bioptic barcode reader 10.

Direct illumination interference may also arise from bioptic barcode readers such as those described above in connection with FIGS. 2, 3A-B, 4A-C and 5A-B. For example, in the example of FIG. 4B, a portion of the sub-field of view 403 is tilted back toward and falls incident on the generally upright window 50. Accordingly, some of the illumination associated with the sub-field of view 403 may fall incident on the image sensor 112 via the paths described above that split the primary field of view 115 of the image sensor 112 to create the sub-fields of view 401, 402 and 403 without having to be reflected by an object in the product scanning region 15. When such direct illumination interference occurs, image data captured by the image sensor 112 for the sub-field of view 401 may be undecodable by the barcode decoder 300 if illumination for the sub-field of view 403 were active when the image data is captured. Such circumstances may cause delays, stalls, pauses, etc. in the decoding of barcodes by the bioptic barcode reader 10.

To mitigate such specular reflections and/or direct illumination interference, disclosed example bioptic barcode readers alternately activate their illumination sources (e.g., the illumination sources 465, 470) to alternately illuminate their sub-fields of view (e.g., the sub-fields of view 401, 402), and only process image data (e.g., decode barcodes) for the currently illuminated sub-field of view. This prevents a sub-field of view (e.g., the sub-field of view 401) from being exposed to specular reflections and/or direct illumination interference caused by illumination of a different sub-field of view (e.g., the sub-field of view 402). To reduce memory requirements, increase barcode decoding speed, decrease image sensor exposure time and/or otherwise improve the performance of the bioptic barcode reader 10, only the imaging data for the portion of the image sensor 112 associated with a currently illumination sub-field of view is captured, processed, decoded, etc.

Computing System

Figure 7:
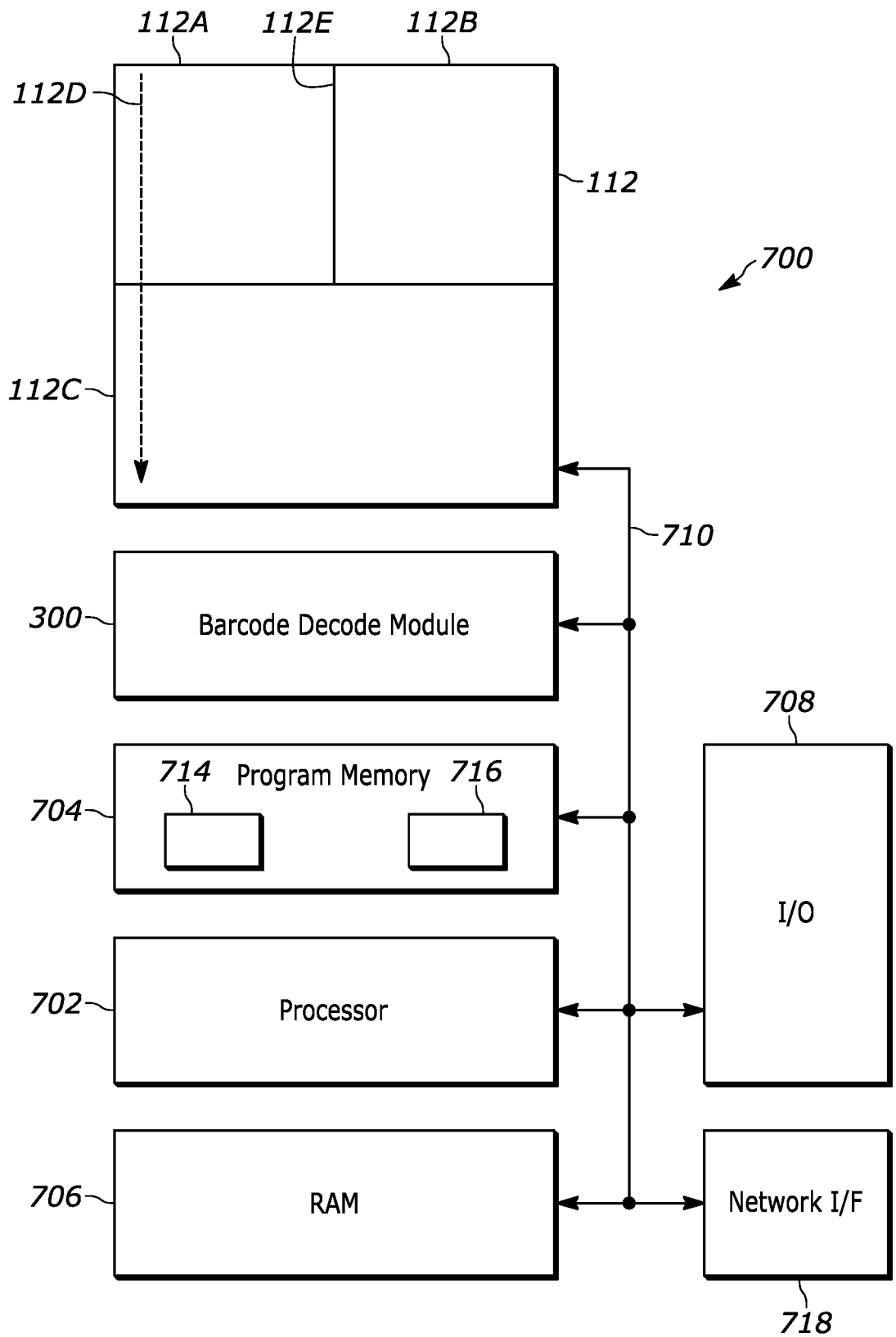
FIG. 7 is a block diagram of an example computing system to implement the various structures and methods for mitigating specular reflections in bioptic barcode readers, in accordance with the disclosed embodiments.

FIG. 7 is a block diagram of an example computing system 700 that may be used to implement the example computing system 310 and/or to mitigate specular reflections and/or direct illumination interference in a bioptic barcode reader. For example, the computing system 700 may carry out the example program of FIG. 8 to mitigate specular reflections and/or direct illumination interference in a bioptic barcode reader.

The computing system 700 includes a processor 702, program memory 704, random-access memory (RAM) 706, an input/output (I/O) circuit 708, the image sensor 112 and the barcode decoder 300, all of which are interconnected via an address/data bus 710. It should be appreciated that although FIG. 7 depicts only one processor 702, the computing system 700 may include multiple processors 702. The processor 702 of the illustrated example is hardware, and may be a semiconductor based (e.g., silicon based) device. In the illustrated example, the barcode decoder 300 is hardware, and may be a semiconductor based (e.g., silicon based) device. Alternatively, the barcode decoder 300 may be software or machine-readable instructions (e.g., a barcode decode module) that may be executed by the processor 702 to decode barcodes. Example hardware-based processors and decode modules include a programmable processor, programmable controller, graphics processing unit (GPU), digital signal processor (DSP), application specific integrated circuit (ASIC), programmable logic device (PLD), field programmable gate array (FPGA), field programmable logic device (FPLD), etc.

The program memory 704 may include any number and/or type(s) of non-transitory, volatile and/or non-volatile, machine-readable storage media, devices or disks storing software or machine-readable instructions that may be executed by the processor 702 to implement all or part of an operating system, one or more programs to mitigate specular reflections, mitigate direct illumination interference, etc. For example, the program memory 704 may store software or machine-readable instructions representing the example program of FIG. 8. The programs may be stored on separate non-transitory, machine-readable storage media, devices or disks.

Example program memories 704, 714, 716 include any number and/or type(s) of volatile or non-volatile, non-transitory, machine-readable storage medium, devices or disks, such as a semiconductor memory, magnetically readable memory, optically readable memory, hard disk drive (HDD), solid-state drive (SSD), read-only memory (ROM) (e.g., a ROM 716), RAM (e.g., a RAM 714), redundant array of independent disks (RAID) system, cache, flash memory, or any other storage media, device or disk in which information may be stored for any duration (e.g., permanently, for an extended time period, for a brief instance, for temporarily buffering, for caching of the information, etc.).

The computing system 700 of FIG. 7 includes one or more communication interfaces such as, for example, a network interface 718 and/or an I/O circuit 708. The communication interface(s) enable the computing system 700 of FIG. 7 to communicate with, for example, another device, system, etc. (e.g., a retail POS system, etc.).

Although FIG. 7 depicts the I/O circuit 708 as a single block, the I/O circuit 708 may include a number of different types of I/O circuits or components that enable the processor 702 to communicate with peripheral I/O devices and/or other computing systems (e.g., a retail POS system, etc.). Example I/O circuits 708 include a universal serial bus (USB) interface, Bluetooth® interface, near field communication (NFC) interface, infrared interface and/or PCI express interface. The peripheral I/O devices may be any desired type of I/O device such as a keyboard, display, touch screen, navigation device (e.g., a mouse, trackball, capacitive touch pad, joystick, etc.), speaker, microphone, printer, button, communication interface, antenna, etc. The I/O circuit 708 typically includes a graphics driver card, graphics driver chip and/or graphics driver processor to drive a display when a display is present.

The network interface 718 may include any network transceiver that enables the computing system 700 to communicate with other computing systems, such as a retail POS system, via a network. The network interface 718 may be a wireless fidelity (Wi-Fi) transceiver, cellular transceiver, Ethernet network transceiver, etc.

The image sensor 112 captures image data (e.g., an image) for a primary field of view represented by all pixels of the image sensor 112. When the primary field of view is split by an optical assembly into different sub-fields of view (e.g., as described above in connection with FIGS. 2, 3A-B, 4A-C and 5A-B), different portions (e.g., portions 112A, 112B and 112C) of the image sensor 112 capture image data for respective different ones of the sub-fields of view. For example, the portion 112A of the image sensor 112 may capture image data representing the sub-field of view 401, the portion 112B of the image sensor 112 may capture image data representing the sub-field of view 402, and the portion 112B of the image sensor 112 may capture image data representing the sub-field of view 403.

When, as illustrated in FIG. 7, the direction 112D in which image data (e.g., pixel data) is read out from the image sensor 112 is parallel to a boundary 100E between two of the portions 112A-C of the image sensor 112, image data for a particular sub-field of view (e.g., the sub-field of view 401 corresponding to the portion 112A) can be read out from the image sensor 112 without having to read out all of the image data for all of the image sensor 112. This can reduce the time it takes to obtain the image data for a particular sub-field of view. In some examples, the image sensor 112 can capture image data at a rate of one hundred and twenty (120) frames per second. Thus, when two sub-fields of view are alternately imaged, image data can still be captured at a rate of sixty (60) frames per second.

Methods of Operating

Figure 8:
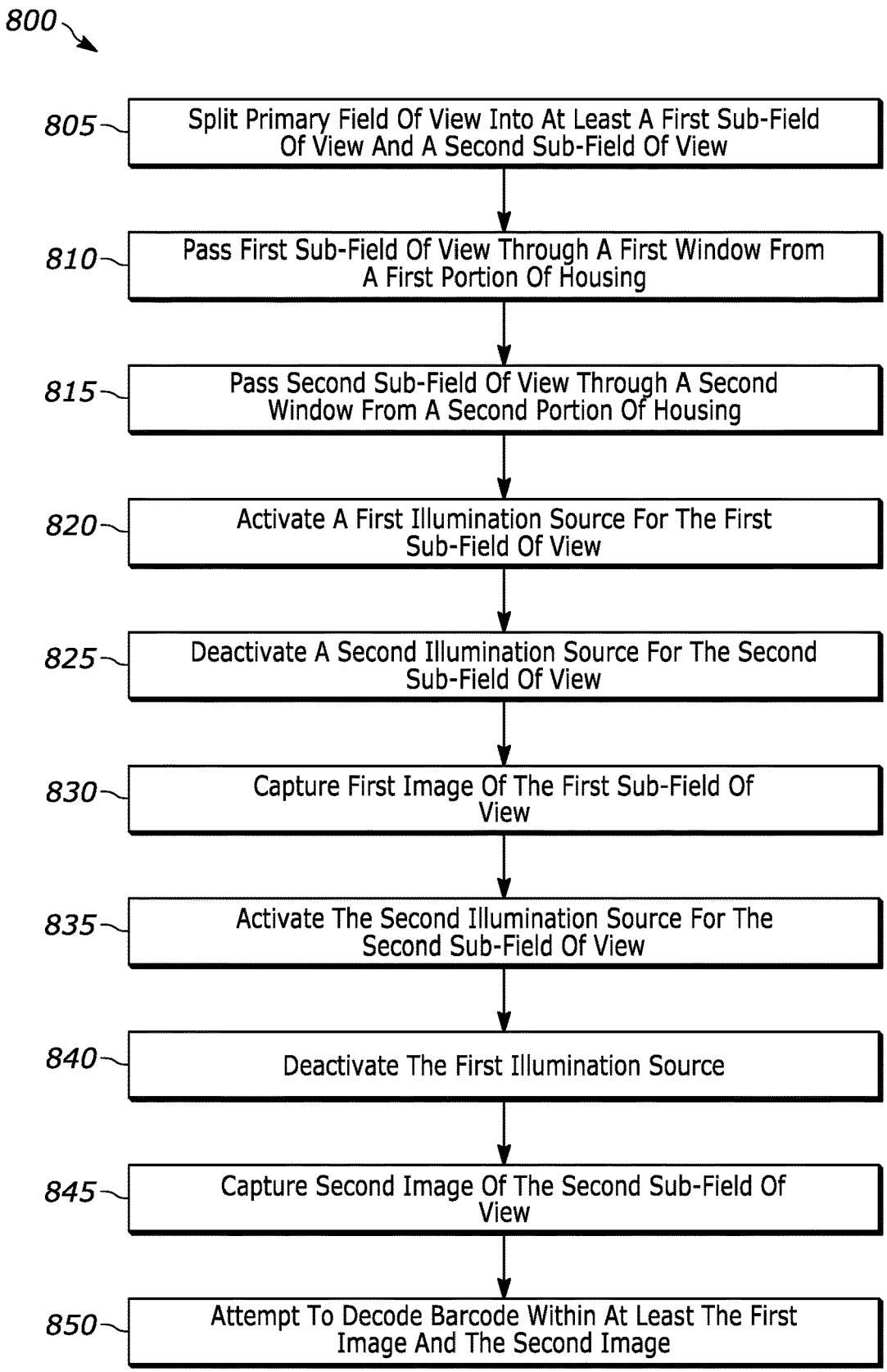
FIG. 8 is a flowchart representative of an example method, hardware logic, machine-readable instructions, or software for mitigating specular reflections in bioptic barcode readers, in accordance with disclosed embodiments.

FIG. 8 is a flowchart 800 representative of example processes, methods, software, machine-readable instructions, etc. that may be carried out to mitigate specular reflections and/or direct illumination interference in a bioptic barcode reader. The processes, methods, software and instructions of FIG. 8 may be one or more executable programs or portions of one or more executable programs for execution by a processor such as the processor 702. The programs may be embodied in software and/or machine-readable instructions stored on a non-transitory, machine-readable storage medium such as the program memory 704. Further, although an example flowchart 800 is illustrated, many other methods of mitigating specular reflections and/or direct illumination interference in a bioptic barcode reader may alternatively be used. For example, the order of execution of the blocks may be changed, and/or some of the blocks described may be changed, eliminated, or combined. Additionally, and/or alternatively, any or all of the blocks may be implemented by one or more of a hardware circuit (e.g., discrete and/or integrated analog and/or digital circuitry), ASIC, PLD, FPGA, FPLD, logic circuit, etc. structured to perform the corresponding operation(s) without executing software or instructions.

The flowchart 800 of FIG. 8 begins at block 805 with an optical assembly of a bioptic barcode reader splitting the primary field of view of an image sensor into two or more sub-fields of view (block 805). Example optical assemblies that may be used to split a primary field of view are described above in connection with FIGS. 2, 3A-B, 4A-B and 5A-B.

A first sub-field of view is passed through a first window of the bioptic barcode reader from a first portion of the bioptic barcode reader in a first direction that crosses a midline of a product scanning region (block 810). For example, in FIG. 4C, a first sub-field of view 401 passes through the generally upright 50 from a first portion 440 of the bioptic barcode reader 10 in a first direction 445 that crosses the midline 450 of the product scanning region 15.

A second sub-field of view is passed through a second window of the bioptic barcode reader from a second portion of the bioptic barcode reader in a second direction that crosses the midline of the product scanning region (block 815). For example, in FIG. 4C, a second sub-field of view 402 passes through the generally upright 50 from a second portion 455 of the bioptic barcode reader 10 in a second direction 460 that crosses the midline 450 of the product scanning region 15. In some embodiments, the second window is the first window. In some embodiments, the first window is the generally upright window 50, and the second window is the generally horizontal window 40.

A first illumination source (e.g., the illumination source 465) associated with the first sub-field of view (e.g., the sub-field of view 401) is activated (block 820) while a second illumination source (e.g., the illumination source 470) associated with the second sub-field of view (e.g., the sub-field of view 402) is deactivated (block 825) and image data (e.g., a first image) for the first sub-field of view is captured (block 830). For example, pixel data from the portion 112A of image sensor 112 is obtained.

The second illumination source (e.g., the illumination source 470) associated with the second sub-field of view (e.g., the sub-field of view 402) is activated (block 835) while the first illumination source (e.g., the illumination source 465) associated with the first sub-field of view (e.g., the sub-field of view 401) is deactivated (block 840) and image data (e.g., a second image) for the second sub-field of view is captured (block 845). For example, pixel data from the portion 112B of image sensor 112 is obtained.

The first image and the second image are processed to attempt to decode one or more barcodes captured in the first and second images (block 850).

Additional Considerations

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Further still, unless expressly stated to the contrary, "or" refers to an inclusive or and not to an exclusive or. For example, "A, B or C" refers to any combination or subset of A, B, C such as (1) A alone, (2) B alone, (3) C alone, (4) A with B, (5) A with C, (6) B with C, and (7) A with B and with C. As used herein, the phrase "at least one of A and B" is intended to refer to any combination or subset of A and B such as (1) at least one A, (2) at least one B, and (3) at least one A and at least one B. Similarly, the phrase "at least one of A or B" is intended to refer to any combination or subset of A and B such as (1) at least one A, (2) at least one B, and (3) at least one A and at least one B.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

What is claimed is:

1. A bioptic barcode reader having a product scanning region, the bioptic barcode reader comprising:
   a housing having a lower housing portion with an upper surface facing the product scanning region, and an upper housing portion extending above the lower housing portion and facing the product scanning region;
   a generally upright window positioned in the upper housing portion;
   an image sensor having a primary field of view;
   an optical assembly configured to split the primary field of view into at least a first sub-field of view and a second sub-field of view, wherein the first sub-field of view passes from a first half of the upper housing portion through the upright window and crosses a midline of the product scanning region in a first direction, wherein the second sub-field of view passes from a second half of the upper housing portion through the upright window and crosses the midline of the product scanning region in a second direction, wherein the second half of the upper housing portion is opposite the first half of the upper housing portion, and wherein the second direction is different from the first direction;
   a first illumination source positioned in the first half of the upper housing portion and configured to illuminate targets appearing within the first sub-field of view;

a second illumination source positioned in the second half of the upper housing portion and configured to illuminate targets appearing within the second sub-field of view;

a controller communicatively coupled to the image sensor, the first illumination source and the second illumination source, the controller configured to:
  instruct the image sensor to capture first images of the first sub-field of view while activating the first illumination source and deactivating the second illumination source, and
  instruct the image sensor to capture second images of the second sub-field of view while activating the second illumination source and deactivating the first illumination source; and a decoder configured to attempt to decode a barcode within at least one of the first images and the second images.

2. The bioptic barcode reader of claim 1, further comprising a generally horizontal window positioned at the upper surface of the lower housing portion, wherein the optical assembly is configured to further split the primary field of view into a third sub-field of view, and wherein the third sub-field of view passes through the horizontal window.

3. The bioptic barcode reader of claim 1, wherein the image sensor is configured to capture the first images using a first portion of the image sensor corresponding to the first sub-field of view, and to capture the second images using a second portion of the image sensor corresponding to the second sub-field of view.

4. The bioptic barcode reader of claim 3, wherein a direction in which pixel data is read out from the image sensor is parallel to a boundary between the first and second portions of the image sensor.

5. The bioptic barcode reader of claim 1, wherein the image sensor is configured to capture the first images of the first sub-field of view by capturing third images of the primary field of view, and wherein the decoder is configured to attempt to decode the barcode within at least one of the first images by attempting to decode the barcode in a portion of at least one of the third images.

6. The bioptic barcode reader of claim 1, wherein the first sub-field of view is oriented to form a leading sub-field of view, and the second sub-field of view is oriented to form a trailing sub-field of view.

7. The bioptic barcode reader of claim 6, wherein the first illumination source is oriented to correspond to the first sub-field of view, and the second illumination source is oriented to correspond to the second sub-field of view.

8. The bioptic barcode reader of claim 1, wherein the first images of the first sub-field of view are captured at a predetermined framerate of 60 frames per second, and the second images of the second sub-field of view are captured at a predetermined framerate of 60 frames per second.

9. A method of operating a bioptic barcode reader having a product scanning region, wherein the bioptic barcode reader includes a housing having a lower housing portion with an upper surface facing the product scanning region, an upper housing portion extending above the lower housing portion and facing the product scanning region, a generally upright window positioned in the upper housing portion, and an image sensor having a primary field of view, the method comprising:
  splitting the primary field of view into at least a first sub-field of view and a second sub-field of view, wherein the first sub-field of view passes from a first half of the upper housing portion through the upright window and crosses a midline of the product scanning region in a first direction, wherein the second sub-field of view passes from a second half of the upper housing portion through the upright window and crosses the midline of the product scanning region in a second direction, wherein the second half of the upper housing portion is opposite the first half of the upper housing portion, and wherein the second direction is different from the first direction;
  while activating a first illumination source to illuminate targets appearing within the first sub-field of view and deactivating a second illumination source, instructing the image sensor to capture first images of the first sub-field of view, wherein the first illumination source is positioned in the first half of the upper housing portion, and wherein the second illumination source is positioned in the second half of the upper housing portion;
  while activating the second illumination source to illuminate targets appearing within the second sub-field of view and deactivating the first illumination source, instructing the image sensor to capture second images of the second sub-field of view; and
  attempting to decode a barcode within at least one of the first images and the second images.

10. The method of claim 9, wherein the lower housing portion includes a generally horizontal window positioned at the upper surface of the lower housing portion, the method further comprising splitting the primary field of view into a third sub-field of view that passes through the horizontal window.

11. The method of claim 9, further comprising configuring the image sensor to capture the first images using a first portion of the image sensor corresponding to the first sub-field of view, and to capture the second images using a second portion of the image sensor corresponding to the second sub-field of view.

12. The method of claim 11, further comprising reading out pixel data of the image sensor in a direction that is parallel to a boundary between the first and second portions of the image sensor.

13. The method of claim 9, further comprising:
  orienting the first sub-field of view to form a leading sub-field of view; and
  orienting the second sub-field of view to form a trailing sub-field of view.

14. The method of claim 13, further comprising:
  orienting the first illumination source to correspond to the first sub-field of view; and
  orienting the second illumination source to correspond to the second sub-field of view.

15. The method of claim 9, further comprising instructing the image sensor to capture the first images of the first sub-field of view by capturing third images of the primary field of view, and wherein the decoder is configured to attempt to decode the barcode within at least one of the first images by attempting to decode the barcode in a portion of at least one of the third images.

16. A bioptic barcode reader having a product scanning region, the bioptic barcode reader comprising:
  a housing having a lower housing portion and an upper housing portion extending above the lower housing portion;
  an image sensor having a primary field of view;
  an optical assembly configured to split the primary field of view into at least a first sub-field of view passing through a first window of the bioptic barcode reader, and a second sub-field of view passing through a second window of the bioptic barcode reader, wherein the first sub-field of view passes from a first portion of the housing through the first window and crosses the product scanning region in a first direction, wherein the second sub-field of view passes from a second portion of the housing through the second window and crosses the product scanning region in a second direction, wherein the second portion of the housing is different from the first portion of the housing, and wherein the second direction is different from the first direction;

a first illumination source positioned in the first portion of the housing and configured to illuminate targets appearing within the first sub-field of view;

a second illumination source positioned in the second portion of the housing and configured to illuminate targets appearing within the second sub-field of view;

a controller communicatively coupled to the image sensor, the first illumination source and second illumination source, the controller configured to:

instruct the image sensor to capture first images of the first sub-field of view while activating the first illumination source and deactivating the second illumination source, and instruct the image sensor to capture second images of the second sub-field of view while activating the second illumination source and deactivating the first illumination source; and a decoder configured to attempt to decode a barcode within at least one of the first images and the second images.

17. The bioptic barcode reader of claim 16, wherein the lower housing portion comprises an upper surface facing the product scanning region, wherein the first window comprises the second window, and wherein the first window is positioned at the upper surface of the lower housing portion.

18. The bioptic barcode reader of claim 16, wherein the lower housing portion comprises an upper surface facing the product scanning region, wherein the first window is positioned at the upper surface of the lower housing portion, and wherein the second window is generally upright and positioned in the upper housing portion.

19. The bioptic barcode reader of claim 16, wherein the image sensor is configured to capture the first images using a first portion of the image sensor corresponding to the first sub-field of view, and to capture the second images using a second portion of the image sensor corresponding to the second sub-field of view.

20. The bioptic barcode reader of claim 16, wherein the first illumination source is oriented to correspond to the first sub-field of view, and the second illumination source is oriented to correspond to the second sub-field of view.

* * * * *